US008736259B2

United States Patent
Manabe et al.

(10) Patent No.: US 8,736,259 B2
(45) Date of Patent: May 27, 2014

(54) ROTATION POSITION SENSOR

(75) Inventors: Yuichi Manabe, Inazawa (JP); Tetsuji Inoue, Nagoya (JP)

(73) Assignee: Aisan Kogyo Kabushiki Kaisha, Obu-Shi (JP)

( * ) Notice: Subject to any disclaimer, the term of this patent is extended or adjusted under 35 U.S.C. 154(b) by 281 days.

(21) Appl. No.: 13/173,824

(22) Filed: Jun. 30, 2011

(65) Prior Publication Data

US 2012/0007592 A1    Jan. 12, 2012

(30) Foreign Application Priority Data

Jul. 8, 2010    (JP) .................................. 2010-155844

(51) Int. Cl.
*G01B 7/30*    (2006.01)

(52) U.S. Cl.
USPC .................................................... 324/207.25

(58) Field of Classification Search
USPC .................................................... 324/207.25
See application file for complete search history.

(56) References Cited

U.S. PATENT DOCUMENTS

| | | | |
|---|---|---|---|
| 4,947,116 A | | 8/1990 | Welcome et al. |
| 5,150,115 A | | 9/1992 | deJong et al. |
| 5,710,509 A | | 1/1998 | Goto et al. |
| 5,994,802 A | * | 11/1999 | Shichijyo et al. ............... 310/51 |
| 8,421,447 B2 | * | 4/2013 | Inoue ....................... 324/207.16 |
| 2010/0156402 A1 | | 6/2010 | Straubinger et al. |
| 2010/0321007 A1 | * | 12/2010 | Fukuda et al. ........... 324/207.25 |

FOREIGN PATENT DOCUMENTS

| | | |
|---|---|---|
| JP | U-54-140743 | 9/1979 |
| JP | A-04-276517 | 10/1992 |
| JP | A-06-095798 | 4/1994 |
| JP | A-09-126809 | 5/1997 |
| JP | A-09-170934 | 6/1997 |
| JP | A-2000-292205 | 10/2000 |
| JP | A-2001-041092 | 2/2001 |
| JP | A-2006-138822 | 6/2006 |
| JP | A-2008-216154 | 9/2008 |
| JP | A-2010-169499 | 8/2010 |

OTHER PUBLICATIONS

Japanese Office Action issued in Application No. 2010-155844; Dated Apr. 9, 2013 (With Translation).

* cited by examiner

*Primary Examiner* — Arleen M Vazquez
*Assistant Examiner* — Feba Pothen
(74) *Attorney, Agent, or Firm* — Oliff PLC (57) ABSTRACT

A rotational position sensor includes a rotor substrate and a stator substrate placed to face each other to detect rotational displacement of the rotor substrate. The rotor substrate is formed with an excitation coil in a meandering pattern on an outer circumferential side and a rotor-side rotary transformer on an inner circumferential side. The stator substrate is formed with four detection coils in a meandering pattern on an outer circumferential side and a stator-side rotary transformer on an inner circumferential side. The four detection coils are arranged in a circumferential direction without overlapping each other. The detection coils are displaced from each other by 360°/8. The rotational position sensor includes a high frequency excitation circuit for applying a high frequency signal to the excitation coil through the rotor-side rotary transformer and the rotor-side rotary transformer to excite the excitation coil.

7 Claims, 8 Drawing Sheets

ROTATION POSITION SENSOR

CROSS-REFERENCE TO RELATED APPLICATIONS

This application is based upon and claims the benefit of priority from the prior Japanese Patent Application No. 2010-155844, filed Jul. 8, 2010, the entire contents of which are incorporated herein by reference.

TECHNICAL FIELD

The present invention relates to an electromagnetic induction type rotational position sensor in which a rotor substrate and a stator substrate are placed to face each other, the sensor being configured to detect rotational displacement of the rotor substrate.

BACKGROUND ART

As a technique of this type, heretofore, a rotation sensor has been widely used in various fields. For vehicle engines, a crank angle sensor which is one of rotation sensors is used to detect rotation speed and rotation phase of an engine. Such type of crank angle sensor is disclosed in JP2001-041092A.

A crank angle sensor using a magnetic pickup is known as a typical example of crank angle sensors. This sensor is commonly used in such a manner that the magnetic pickup consisting of a magnet and a coil is placed to face a gear-like magnetic member provided on a rotary shaft, and the distance of the gap or clearance between the pickup and the magnetic member is changed to thereby output a voltage waveform from the magnetic pickup. However, this system is problematic in that the magnetic pickup has a limitation in sharpening magnetic flux at a leading end of the magnetic pickup and also the gear-like magnetic member has a limitation increasing of the number of gear teeth, resulting in a limit on angle resolution.

Further, an optical rotary encoder is generally known as another system for detecting rotation. One example thereof is disclosed in JP6(1994)-095798A. However, the rotary encoder, which employs light, is apt to be affected by adhesion of contaminants. If a slit is made narrower to increase the resolution, the slit is liable to be clogged with contaminants. It is therefore difficult to use such rotary encoder in an adverse environment that is likely exposed to oil, dust, and others.

Instead of the above optical type, an electromagnetic induction type rotary encoder configured to utilize changes in magnetic field is conceivable to avoid the above problems with contaminants. One example thereof is disclosed in JP9 (1997)-170934A. This electromagnetic induction type rotary encoder includes a magnet fixed to a rotary body and a plurality of coil patterns placed to face the magnet and arranged to detect the passage of the magnet associated with rotation of the rotary body. Those coil patterns are placed with their phases electrically displaced within a coil pattern region on a printed circuit board and with electric phase displacement.

However, in the electromagnetic induction type rotary encoder disclosed in JP9(1997)-170934A, the magnetic field around a detection coil is changed by movement of the magnet associated with the rotation of the rotary body, thereby generating induced currents in a coil pattern (one turn coil) serving as a detection coil. To obtain sufficient output, however, the rotary body has to be rotated at a higher rotation speed than a certain level. While the rotary body is rotated at a low speed, the angle could not be detected. It is conceived to increase the number of turns of the detection coil or increase the size of the magnet to obtain higher outputs and wide detectable rotation speed range. However, this may cause a problem with an increase in size of the rotational position sensor.

On the other hand, as a method not increasing the number of winding turns of the rotational position sensor, JP2000-292205A discloses the use of a high frequency excitation signal for a resolver to be used as a rotational position sensor.

SUMMARY OF INVENTION

Technical Problem

However, the rotary encoder disclosed in JP9(1997)-170934A has limitations in reducing the size of the magnet in the rotary body and the size of the winding coil. Specifically, such size reduction may cause problems with a deterioration in required resolution of detection angle and a decrease in the rotation speed range in which angle detection is enabled. To the contrary, the rotational position sensor has to be increased in size in order to obtain desired performance. Consequently, it is hard to realize a small-sized and high-resolution rotational position sensor.

On the other hand, when an excitation coil and a detection coil each formed in a meandering pattern is used, as the angle in a circumferential direction of one cycle of a segment of the meandering pattern is set smaller (that is, a coil pitch is set narrower), the detection angle resolution could be increased. However, when the pitch is made narrower, the gap or clearance between a rotor substrate and a stator substrate has to be made narrower. This is because, to detect the magnetic flux of only the corresponding coil, the gap between the rotor substrate and the stator substrate needs to be decreased according to narrowing of the pitch.

However, for narrowing the gap between the rotor substrate and the stator substrate, it is necessary to increase the manufacturing accuracy for flatness and others of the rotor substrate and the stator substrate. This leads to cost increase.

The present invention has been made in view of the circumstances to solve the above problems and has a purpose to provide a rotational position sensor with reduced size and high resolution of rotation angle.

Solution to Problem

To achieve the above purpose, one aspect of the invention provides an electromagnetic induction type rotational position sensor including a rotor substrate and a stator substrate placed to face each other, the rotational position sensor being configured to detect rotational displacement of the rotor substrate, wherein the rotor substrate is formed with an excitation coil of a meandering pattern on an outer circumferential side and a rotor-side rotary transformer is formed on an inner circumferential side, the stator substrate is formed with n-pieces of detection coils of a meandering pattern (n is an integer number of 2 or more) on an outer circumferential side and a stator-side rotary transformer on an inner circumferential side, the n-pieces of detection coils are arranged in a circumferential direction without overlapping each other, the detection coils are displaced from each other by 360°/(2n), and the rotational position sensor includes a high frequency excitation circuit for applying a high frequency signal to the excitation coil through the rotor-side rotary transformer and the rotor-side rotary transformer to excite the excitation coil.

For instance, there is assumed that the number of the detection coils is four and they are displaced in sequence by 45° in electrical angle. In this case, one cycle of a segment of the meandering pattern of each detection coil is set to 8°. A first detection coil, a second detection coil, a third detection coil, and a fourth detection coil are formed on an outer circumferential side so that the second detection coil is displaced from the first detection coil by an electrical angle of 45° (1° in actual mechanical angle) in the circumferential direction, the third detection coil is displaced from the first detection coil by an electrical angle of 90° (2° in actual mechanical angle) in the circumferential direction, and the fourth detection coil is displaced from the first detection coil by an electrical angle of 135° (3° in actual mechanical angle) in the circumferential direction.

Herein, when a high frequency excitation signal of 2 MHz for example is applied to the excitation coil of the rotor substrate through the stator-side rotary transformer and the rotor-side rotary transformer, the excitation coil of the rotating rotor substrate generates a magnetic flux by the 2 MHz high frequency signal with respect to the stator substrate.

Thus, the first detection coil, the second detection coil, the third detection coil, and the fourth detection coil generate induced voltages displaced from each other by 45° in electrical angle. Accordingly, detectable rotation angle resolution of each detection coil is 4°, but the detection coils can provide a total resolution of 1°. This can achieve a rotational position sensor with reduced size and high resolution.

DESCRIPTION OF EMBODIMENTS

A detailed description of a first preferred embodiment of a rotational position sensor according to the present invention applied to an "electromagnetic induction type rotary encoder" will now be given referring to the accompanying drawings.

Figure 1:
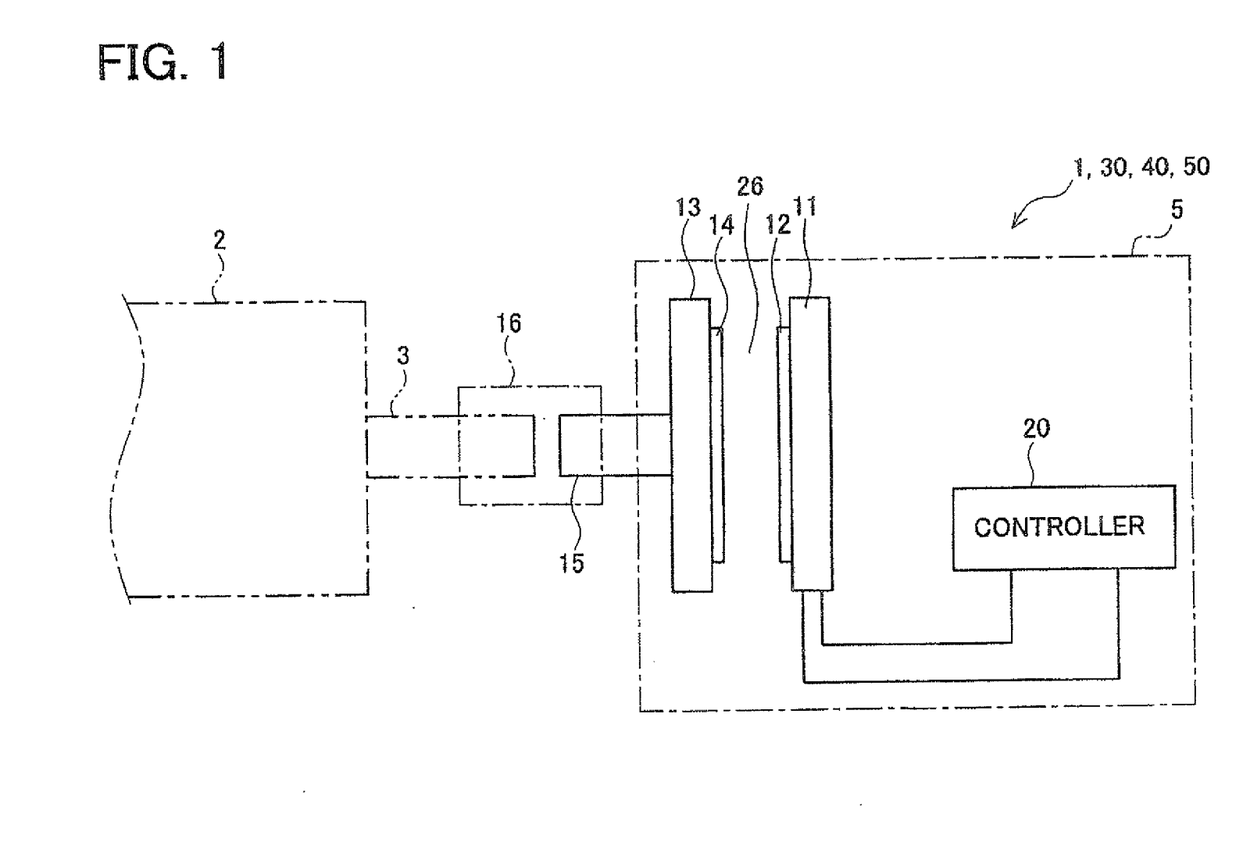
FIG. 1 is a schematic configuration view showing an outer appearance of a rotary encoder of a first embodiment.

FIG. 1 is a schematic configuration view of a rotary encoder 1 of this embodiment. As one example, this rotary encoder 1 is provided in correspondence with a crank shaft 3 of an engine 2 and used to detect the operating position (rotation angle) of the crank shaft 3.

The rotary encoder 1 includes a stator substrate 11 on which surface a detection coil 12 (12A-12D) and others are provided, the stator substrate 11 being fixed to a housing 5, a rotor substrate 13 on which surface an excitation coil 14 and others are formed, the rotor substrate 13 being fixed to the crank shaft 3 so as to face the stator substrate 11 and being rotatable together with the crank shaft 3, and a controller 20 configured to output an excitation signal to the excitation coil 14 and process a detection signal received from the detection coil 12 (12A-12D).

The stator substrate 11 and the rotor substrate 13 are formed in circular plate shapes having almost the same size and face each other at a predetermined distance (i.e., with a gap 26). The rotor substrate 13 is integrally connected with an input shaft 15 centered on an opposite surface from the surface formed with the excitation coil 14 and others. This input shaft 15 is placed protruding out of the housing 5 and fixed to the crank shaft 3 through a coupling 16 so that the input shaft 15 is rotatable together with the crank shaft 3.

Figure 2:
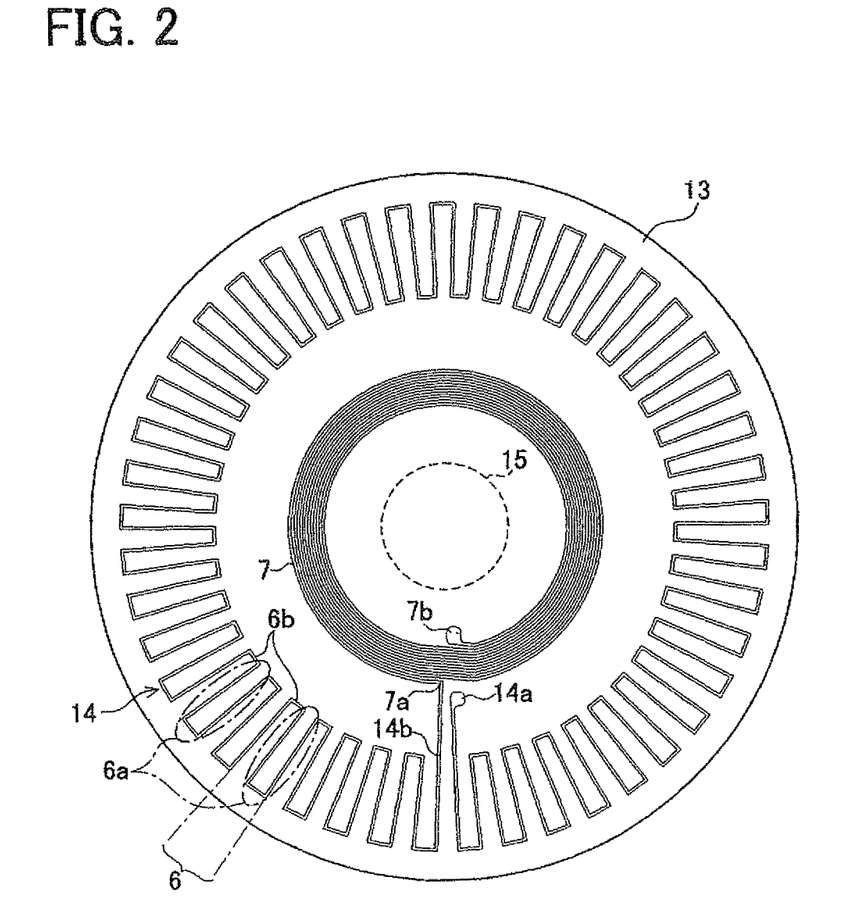
FIG. 2 is a view showing the shape and the placement of an excitation coil and a rotor-side rotary transformer on a rotor substrate.

FIG. 2 shows the excitation coil 14 and a rotor-side rotary transformer 7, both of which are formed on the flat surface which is one side of the rotor substrate 13. The excitation coil 14 is arranged in a circle along an outer edge of the one side of the rotor substrate 13. The excitation coil 14 is formed in a "meandering coil pattern" in which a wire is bent repeatedly in rectangular form.

In this embodiment, the "meandering coil pattern" includes rectangular portions 6a (e.g., forty-five rectangular portions) each protruding radially toward an outer edge of the rotor substrate 13, as shown in an elliptical alternate long and short dash line in FIG. 2, and connecting portions 6b that join adjacent ones of the rectangular portions 6a. One rectangular portion 6a and one connecting portion 6b adjacent thereto constitute one meandering pattern segment 6 as shown in FIG. 2. The "meandering coil pattern" is constituted of a plurality (forty-five in this embodiment) of meandering pattern segments 6 continuously arranged. Each meandering pattern segment 6 occupies an area corresponding to a mechanical angle of 8°=360°/45 in the circumferential direction.

One end 14b of the excitation coil 14 is connected to one end 7a of the rotor-side rotary transformer 7 having a vortical shape of five turns and placed at the center. The other end 7b of the rotary transformer 7 is connected to the other end 14a of the excitation coil 14 on a back surface of the rotor substrate 13. That is, the rotary transformer 7 and the excitation coil 14 are integrally formed as a continuous coil.

In this embodiment, the coil pattern is made of copper having a width of 0.3 mm and a thickness of 0.03 mm. This coil pattern is made by etching but may be produced by press punching or other techniques. In such a case, the thickness may be appropriately increased.

Figure 3:
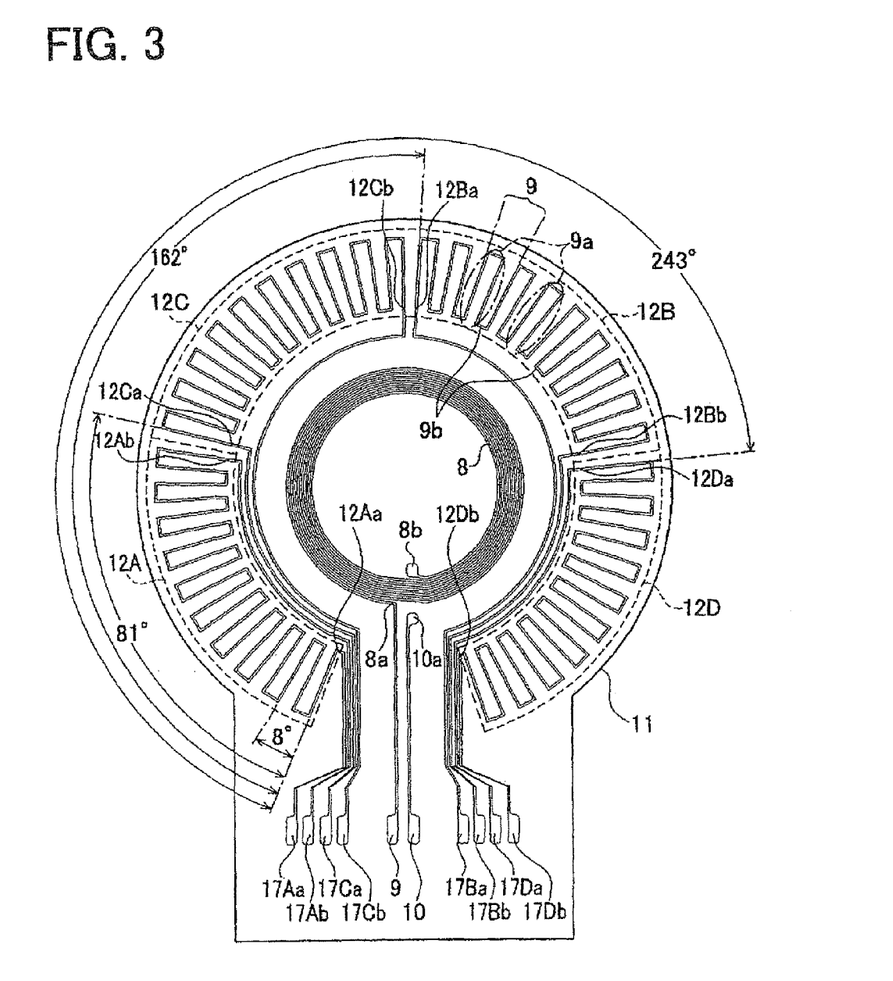
FIG. 3 is a view showing the shape and the placement of a detection coil and a stator-side rotary transformer on a stator substrate.

FIG. 3 shows the detection coil 12 (four detection coils 12A, 12B, 12C, and 12D) and a stator-side rotary transformer 8, each of which is formed on one side of the stator substrate 11.

The detection coil 12 (12A-12D) is arranged in a circumferential direction along the outer edge of one surface of the stator substrate 11. The detection coil 12 (12A-12D) is formed in a "meandering coil pattern" in which a wire is bent repeatedly in rectangular form. In this embodiment, the "meandering coil pattern" includes rectangular portions 9a (e.g., forty-five rectangular portions in total) each protruding radially to the outer edge of the stator substrate 11, as shown in an elliptical alternate long and short dash line in FIG. 3 and connecting portions 9b that join adjacent ones of the rectangular portions 9a. One rectangular portion 9a and one connecting portion 9b adjacent thereto constitute one meandering pattern segment 9 as shown in FIG. 3.

The detection coil 12 consists of four detection coils 12A, 12C, 12B, and 12D which are arranged clockwise in this order in the circumferential direction. Each of those detection coils 12A to 12D includes ten meandering pattern segments 9.

The detection coil 12C is placed with a displacement of 45° in electrical angle (1° in mechanical angle) from the detection coil 12A in the circumferential direction. That is, when the detection coil 12A is positioned to coincide with the excitation coil 14, the detection coil 12C is located in a position displaced from the excitation coil 14 by an electrical angle of 45°, i.e., a mechanical angle of 1°.

The detection coil 12B is placed with a displacement of 90° in electrical angle (2° in mechanical angle) from the detection coil 12A in the circumferential direction. That is, when the detection coil 12A is positioned to coincide with the excitation coil 14, the detection coil 12B is located in a position displaced from the excitation coil 14 by an electrical angle of 90°, i.e., a mechanical angle of 2°.

Further, the detection coil 12D is placed with a displacement of 135° in electrical angle (3° in mechanical angle) from the detection coil 12A in the circumferential direction. That is, when the detection coil 12A is positioned to coincide with the excitation coil 14, the detection coil 12D is located in a position displaced from the excitation coil 14 by an electrical angle of 135°, i.e., a mechanical angle of 3°.

Herein, the shape and the size of the detection coil 12 (12A-12D) are basically equal to those of the excitation coil 14. One meandering pattern segment 9 occupies an area corresponding to a mechanical angle of 8° in the circumferential direction. Accordingly, the 45° electrical angle and the 1° mechanical angle are equal by 45/360=1/8, the 90° electrical angle and the 2° mechanical angle are equal by 90/360=2/8, and the 135° electrical angle and the 3° mechanical angle are equal by 135/360=3/8.

In this embodiment, the meandering detection coil 12 consists of four coils (12A, 12B, 12C, and 12D) displaced from each other by an electrical angle of 45°=360°/(2*4). In other words, when the detection coil 12A is positioned at the same electrical angle as the excitation coil 14, the detection coil 12C is placed with a displacement of 45° in electrical angle from the excitation coil 14. The detection coil 12B is placed with a displacement of 90°=45°*2 from the excitation coil 14. Further, the detection coil 12D is placed with a displacement of 135°=45°*3 from the excitation coil 14.

One end 12Aa of the detection coil 12A is connected to an external terminal 17Aa and the other end 12Ab is connected to an external terminal 17Ab. One end 12Ca of the detection coil 12C is connected to an external terminal 17Ca and the other end 12Cb is connected to an external terminal 17Cb. One end 12Ba of the detection coil 12B is connected to an external terminal 17Ba and the other end 12Bb is connected to an external terminal 17Bb. One end 12Da of the detection coil 12D is connected to an external terminal 17Da and the other end 12Db is connected to an external terminal 17Db.

On the center area of the stator substrate 11, the stator-side rotary transformer 8 is formed in a vortical shape of five turns, facing the rotor-side rotary transformer 7 formed on the rotor substrate 13. One end 8a of the stator-side rotary transformer 8 is connected to an external terminal 9 and the other end 8b is connected to a terminal 10a via a back surface. The terminal 10a is connected to an external terminal 10.

Figure 4:
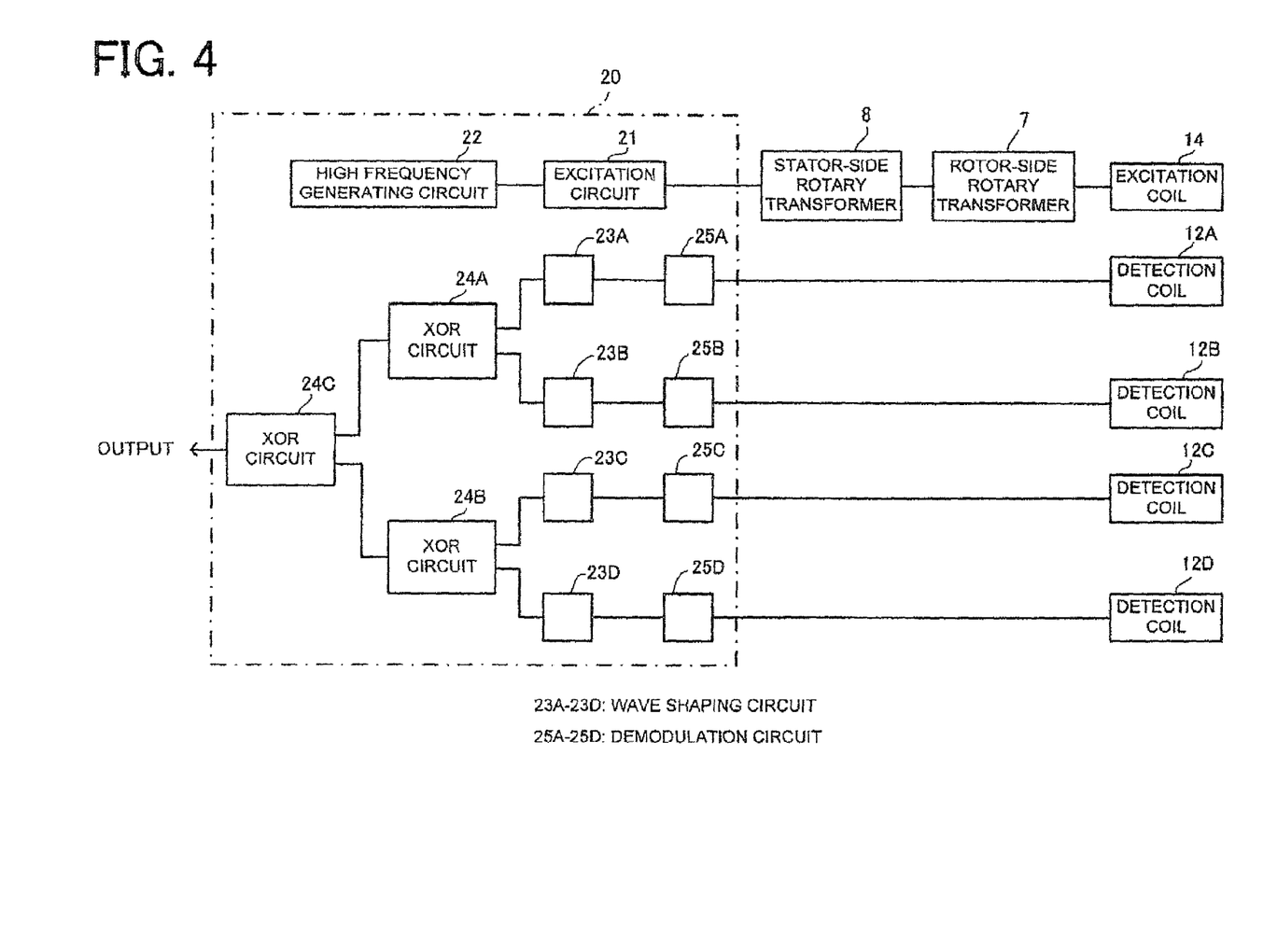
FIG. 4 is a block diagram showing a control configuration of the rotary encoder.

FIG. 4 is a block diagram showing an electrical control configuration of the rotary encoder 1. A controller 20 includes an excitation circuit 21, a high frequency generating circuit 22, four demodulation circuits 25A, 25B, 25C, and 25D, four wave shaping circuits 23A, 23B, 23C, and 23D, and three exclusive logical sum (XOR) circuits 24A, 24B, and 24C.

The excitation circuit 21 is configured to excite the excitation coil 14 with a high frequency signal. The high frequency generating circuit 22 is configured to supply a high frequency signal to the excitation circuit 21. In this embodiment, this high frequency signal has a frequency of 2 MHz. By excitation with a high frequency signal of 500 kHz or more, even a detection circuit having a small number of winding turns like a meandering coil pattern can reliably provide sufficient induced voltage. The induced voltage (current) generated in each cycle (period) of a high frequency signal is small. However, when the induced voltages by high frequencies are summed up, sufficient induced voltage can be obtained. The present applicants experimentally confirmed that the use of a high frequency signal of 500 kHz or more could obtain suitable induced voltage for actual use whereby providing a sufficient S/N ratio to peripheral noise.

The detection coil 12A is connected to the wave shaping circuit 23A through the demodulation circuit 25A. The detection coil 12B is connected to the wave shaping circuit 23B through the demodulation circuit 25B. The detection coil 12C is connected to the wave shaping circuit 23C through the demodulation circuit 25C. The detection coil 12D is connected to the wave shaping circuit 23D through the demodulation circuit 25D.

The demodulation circuits 25A, 25B, 25C, and 25D respectively receive excitation signals of the excitation circuit 21 and using the excitation signal as a synchronous detection signal, convert detection signals output from the detection coils 12A to 12D respectively into demodulated signals by synchronous detection.

The wave shaping circuits 23A, 23B, 23C, and 23D receive the demodulated signals from the demodulation circuits 25A, 25B, 25C, and 25D respectively and, by respective comparators, convert them into pulse signals of a frequency to be generated by the meandering pattern.

Operations of the rotary encoder 1 having the above configuration in the first embodiment will be explained below. When the crank shaft 3 is rotated, the rotor substrate 13 in the rotary encoder 1 is rotated together with the crank shaft 3, thus rotating the excitation coil 14 while facing the detection coils 12A to 12D of the stator substrate 11 spaced by the gap 26 from the excitation coil 14.

At that time, the high frequency generating circuit 22 and the excitation circuit 21 excite the excitation coil 14 with a high frequency (2 MHz) of a fixed amplitude through the stator-side rotary transformer 8 and the rotor-side rotary transformer 7. Accordingly, magnetic lines are periodically generated in the excitation coil 14, thus generating induced voltages in the detection coils 12A to 12D placed facing the excitation coil 14. In this state, the degree of coupling between the excitation coil 14 and each of the detection coils 12A to 12D varies with the rotation angle of the rotor substrate 13. Thus, the magnitude of generated induced voltage also varies with the rotation angle of the rotor substrate 13.

Consequently, the detection coils 12A to 12D output detection signals obtained by amplitude modulating a carrier wave of the same frequency as the excitation signal according to the rotation angle of the rotor substrate 11 (phase differences between the excitation coil 14 and the detection coils 12A, 12B, 12C, and 12D). The detection signals are demodulated by the demodulation circuits 25A, 25B, 25C, and 25D respectively. Thus, low-frequency demodulated signals reflecting a change in the rotation angle (a change in the rotation phase) of the crank shaft 3 are obtained. The demodulated signals are shaped into pulse-like signals by the wave shaping circuits 23A, 23B, 23C, and 23D.

Figure 5:
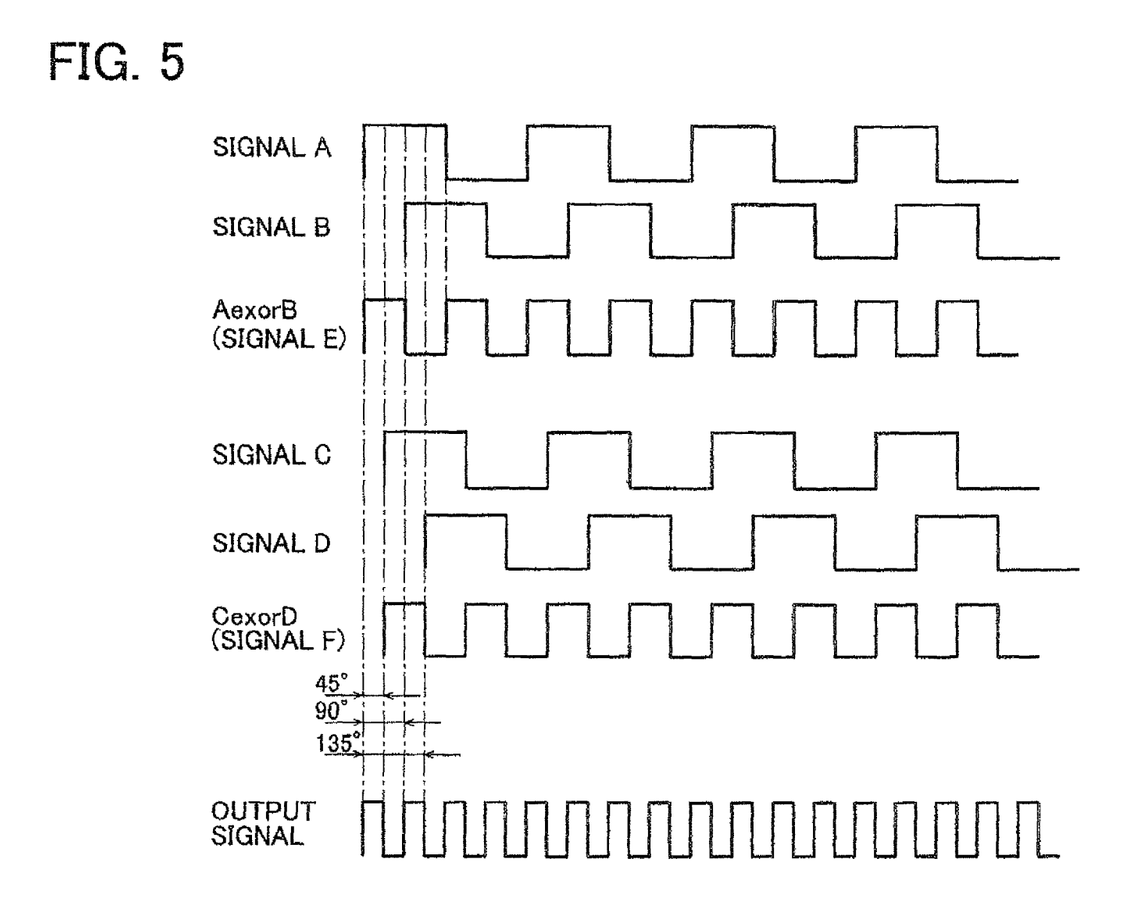
FIG. 5 is a chart showing control signals of the rotary encoder.

In FIG. 5, an output wave from the wave shaping circuit 23A is shown as a signal A; an output wave from the wave shaping circuit 23B is shown as a signal B; an output wave from the wave shaping circuit 23C is shown as a signal C; and an output wave from the wave shaping circuit 23D is shown as a signal D.

As shown in FIG. 5, the signal A and the signal B are displaced in phase by an electrical angle of 90° from each other. The signal A and the signal C are displaced in phase by an electrical angle of 45° from each other, and the signal A and the signal D are displaced in phase by an electrical angle of 135° from each other.

The signal A which is an output signal of the wave shaping circuit 23A and the signal B which is an output signal of the wave shaping circuit 23B are input into the XOR circuit 24A to obtain an exclusive logical sum of the signals A and B. When the signals A and B are input into the XOR circuit 24A, this circuit 24A outputs "0" if both the signals A and B are "1" or "0", whereas outputs "1" if one of the signals A and B is "1" and the other is "0". Accordingly, a signal E output from the XOR circuit 24A is a pulse signal having a waveform as shown in FIG. 5.

Similarly, when the signal C output from the wave shaping circuit 23C and the signal D output from the wave shaping circuit 23D are input into an XOR circuit 24B, a signal F is obtained as an output signal.

When the signal E output from the XOR circuit 24A and the signal F output from the XOR circuit 24B are input into an XOR circuit 24C, an output signal shown in FIG. 5 is obtained.

As above, the detection coils 12 (12A-12D) are formed so that the detection coil 12C is displaced from the detection coil 12A by an electrical angle of 45°, the detection coil 12B is displaced from the detection coil 12A by an electrical angle of 90°, and the detection coil 12D is displaced from the detection coil 12A by an electrical angle of 135°. Accordingly, respective detection signals are obtained as the signals A, B, C, and D displaced from each other by an electrical angle of 45°. Thus, resolution of detection position can be made four times larger.

Since the XOR circuits 24A, 24B, and 24C are simple circuits, they need no complicated electric circuits and thus can be realized at low cost.

In the present embodiment, the exclusive logical sum of the signal A and the signal B is taken, the exclusive logical sum of the signal C and the signal D is taken, and then an exclusive logical sum of them is taken. However, even when the exclusive logical sum is taken by another order, the same result is obtained.

As explained in detail above, the electromagnetic induction type rotary encoder 1 of the present embodiment including the rotor substrate 13 and the stator substrate 11 placed to face each other. The rotary encoder 1 is configured to detect rotational displacement of the rotor substrate 13 provides the following configurations. On the rotor substrate 13, the excitation coil 14 is formed in a meandering pattern on the outer circumferential side and the rotor-side rotary transformer 7 is formed on the inner circumferential side. On the stator substrate 11, n-pieces (n=4 in the present embodiment) of the detection coils 12A, 12B, 12C, and 12D are formed in meandering patterns on the outer circumferential side and the stator-side rotary transformer 8 is formed on the inner circumferential side. Four detection coils 12A to 12D are arranged in the circumferential direction without overlapping each other. Those detection coils 12A to 12D are displaced from each other by an electrical angle of 360°/8. The rotary encoder 1 includes the high frequency excitation circuits 22 and 21 for applying the high frequency signal to the excitation coil 14 through the stator-side rotary transformer 8 and the rotor-side rotary transformer 7 to thereby excite the excitation coil 14.

The fast detection coil 12A, the second detection coil 12B, the third detection coil 12C, and the fourth detection coil 12D generate induced voltages displaced from each other by an electrical angle of 45°. Although the detectable rotational angle resolution of each of the detection coils 12A, 12B, 12C, and 12D is 4°, their total resolution of 1° can be obtained. This can realize a rotational position sensor with a entirely reduced size and also high resolution.

Further, the four detection coils 12A to 12D are formed on the same layer. This makes it possible to eliminate variations between the detection coils and increase detection accuracy. Forming the detection coils on the same layer also can achieve reduction of manufacturing cost.

Since the high frequency signal is 500 kHz or more, which is a high frequency excitation signal, the number of winding turns of each detection coil 12A to 12D can be reduced. Thus, a detection coil in a meandering pattern on a substrate surface can be realized. As above, the excitation coil 14 on the rotor substrate 13 and the detection coils 12A to 12D on the stator substrate 11 can be provided, so that the rotational position sensor can have a reduced length in the axial direction. Thus, a rotational position sensor can be entirely reduced in size.

Moreover, the rotary encoder 1 further includes the XOR circuits 24A to 24C to output exclusive logical sums of the output signals of the four detection coils 12A to 12D. It is therefore possible to perform a signal processing by use of only a simple logical circuit IC chip without needing a complicated processing and hence achieve a reduced cost. For instance, if a rotational position sensor that needs a complicated electrical circuit is used as a crank angle sensor, it may cause a cost increase as compared with a conventional crank angle sensor that hardly needs an electrical circuit. The rotational position sensor of the present embodiment including only simple circuits can suppress cost increase.

A rotary encoder 30 of a second embodiment of the invention will be described below. The rotary encoder 30 of this embodiment is almost equal in structure and operations to the rotary encoder 1 of the first embodiment. Thus, similar or identical parts are given the same reference signs as those in the first embodiment and their details are not explained repeatedly. The following explanation is therefore given to differences from the first embodiment.

Figure 6:
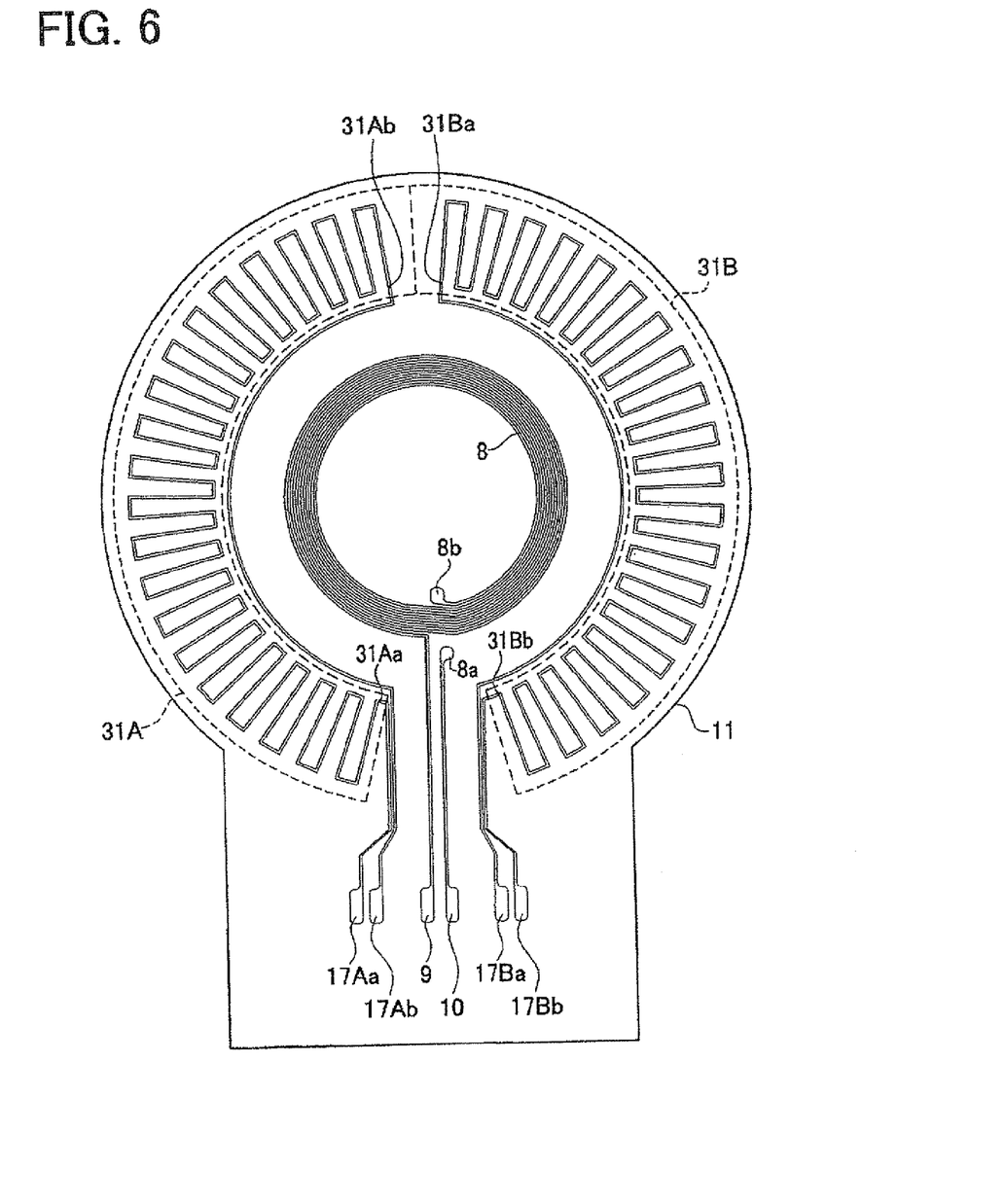
FIG. 6 is a view showing the shape and the placement of a detection coil of a rotary encoder of a second embodiment.

As shown in FIG. 6, a stator substrate 11 on the rotary encoder 30 includes two detection coils 31A and 31B. The detection coil 31B is formed in a position displaced from the detection coil 31A by 90° in electrical angle (2° in mechanical angle). Both ends 31Aa and 31Ab of the detection coil 31A are connected to terminals 17Aa and 17Ab respectively. Both ends 31Ba and 31Bb of the detection coil 31B are connected to terminals 17Ba and 17Bb respectively.

According to the rotary encoder 30 of this embodiment, the resolution is 2°, which is as low as half the resolution of the rotary encoder 1 of the first embodiment. However, the induced currents in the detection coils 31A and 31B are larger than in the first embodiment. Consequently, the rotary encoder 30 can achieve a higher S/N ratio than the rotary encoder 1.

A rotary encoder 40 of a third embodiment of the invention will be described below. The rotary encoder 40 of this embodiment is almost equal in structure and operations to the rotary encoder 1 of the first embodiment. Thus, similar or identical parts are given the same reference signs as those in the first embodiment and their details are not explained repeatedly. The following explanation is therefore given to differences from the first embodiment.

Figure 7:
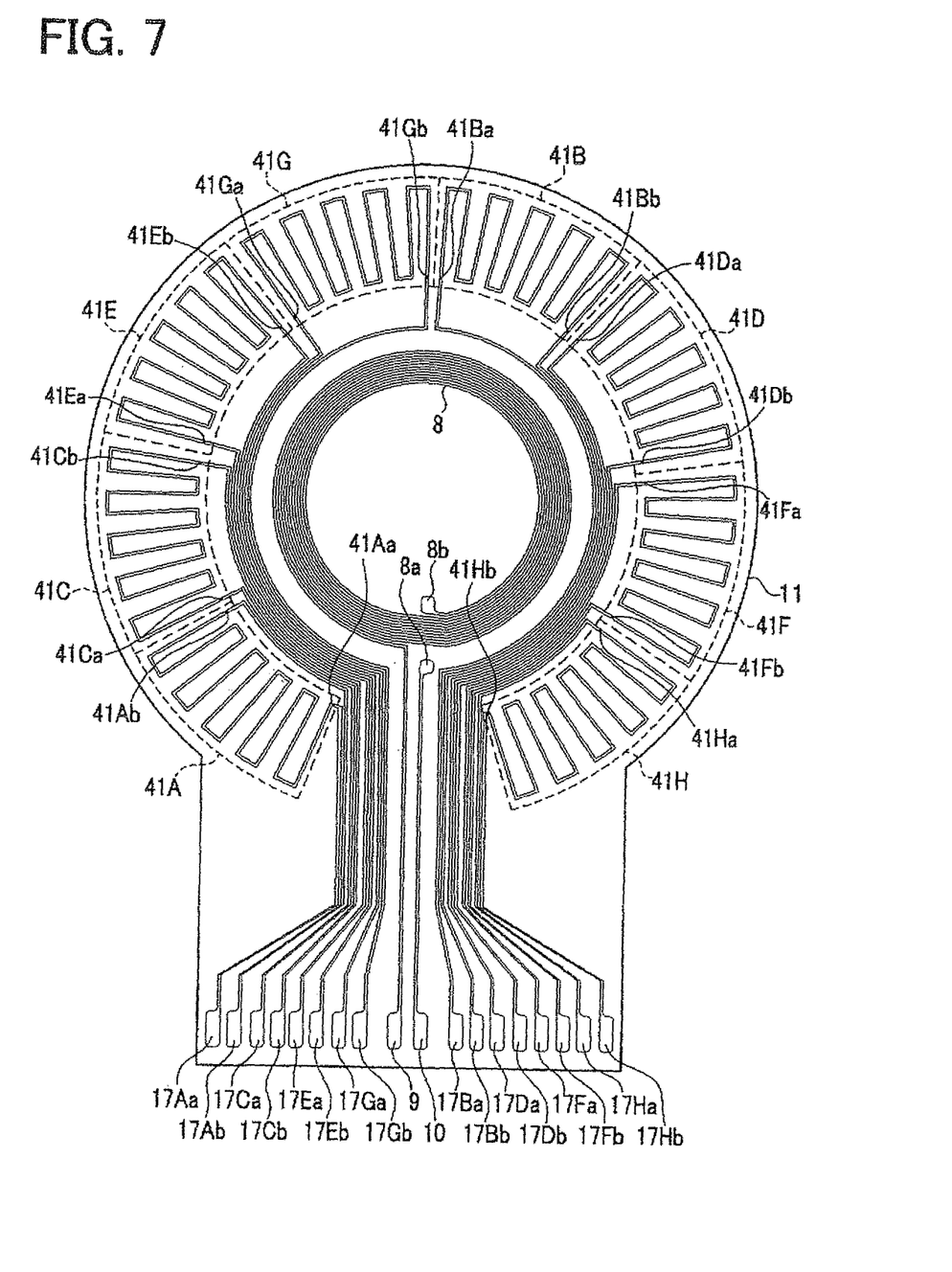
FIG. 7 is a view showing the shape and the placement of a detection coil of a rotary encoder of a third embodiment.

As shown in FIG. 7, a stator substrate 11 of the rotary encoder 40 includes eight detection coils 41A, 41B, 41C, 41D, 41E, 41F, 41G, and 41H. The detection coil 41C is formed in a position displaced from the detection coil 41A by 22.5° in electrical angle (0.5° in mechanical angle). The detection coil 41E is formed in a position displaced from the detection coil 41A by 45° in electrical angle (1° in mechanical angle). The detection coil 41G is formed in a position displaced from the detection coil 41A by 67.5° in electrical angle (1.5° in mechanical angle).

The detection coil 41B is formed in a position displaced from the detection coil 41A by 90° in electrical angle (2° in mechanical angle). The detection coil 41D is formed in a position displaced from the detection coil 41A by 112.5° in electrical angle (2.5° in mechanical angle). The detection coil 41F is formed in a position displaced from the detection coil 41A by 135° in electrical angle (3° in mechanical angle). The detection coil 41H is formed in a position displaced from the detection coil 41A by 152.5° in electrical angle (3.5° in mechanical angle).

Both ends 41Aa and 41Ab of the detection coil 41A are connected to terminals 17Aa and 17Ab respectively. Both ends 41Ca and 41Cb of the detection coil 41C are connected to terminals 17Ca and 17Cb respectively. Both ends 41Ea and 41Eb of the detection coil 41E are connected to terminals 17Ea and 17Eb respectively. Both ends 41Ga and 41Gb of the detection coil 41O are connected to terminals 17Ga and 17Gb respectively. Both ends 41Ba and 41Bb of the detection coil 41B are connected to terminals 17Ba and 17Bb respectively. Both ends 41Da and 41Db of the detection coil 41D are connected to terminals 17Da and 17Db respectively. Both ends 41Fa and 41Fb of the detection coil 41F are connected to terminals 17Fa and 17Fb respectively. Further, both ends 41Ha and 41Hb of the detection coil 41 are connected to terminals 17Ha and 17Hb respectively.

According to the rotary encoder 40 of this embodiment, the resolution can be can increased as large as 0.5°, which is double the resolution of the rotary encoder 1 of the first embodiment. However, the induced currents generated in the detection coils 41A to 41H are smaller than in the first embodiment, leading to a lower S/N ratio than in the first embodiment.

A rotary encoder 50 of a fourth embodiment of the invention will be explained below. The rotary encoder 50 of this embodiment is almost equal in structure and operations to the rotary encoder 1 of the first embodiment. Thus, similar or identical parts are given the same reference signs as those in the first embodiment and their details are not explained repeatedly. The following explanation is therefore given to differences from the first embodiment.

The rotary encoder 50 includes four detection coils 12A, 12B, 12C, and 12D as with the rotary encoder 1, but includes a different structure from the rotary encoder 1 in connecting terminals of the four detection coils 12A to 12D with external terminals. This different structure is explained below referring to FIG. 8.

Figure 8:
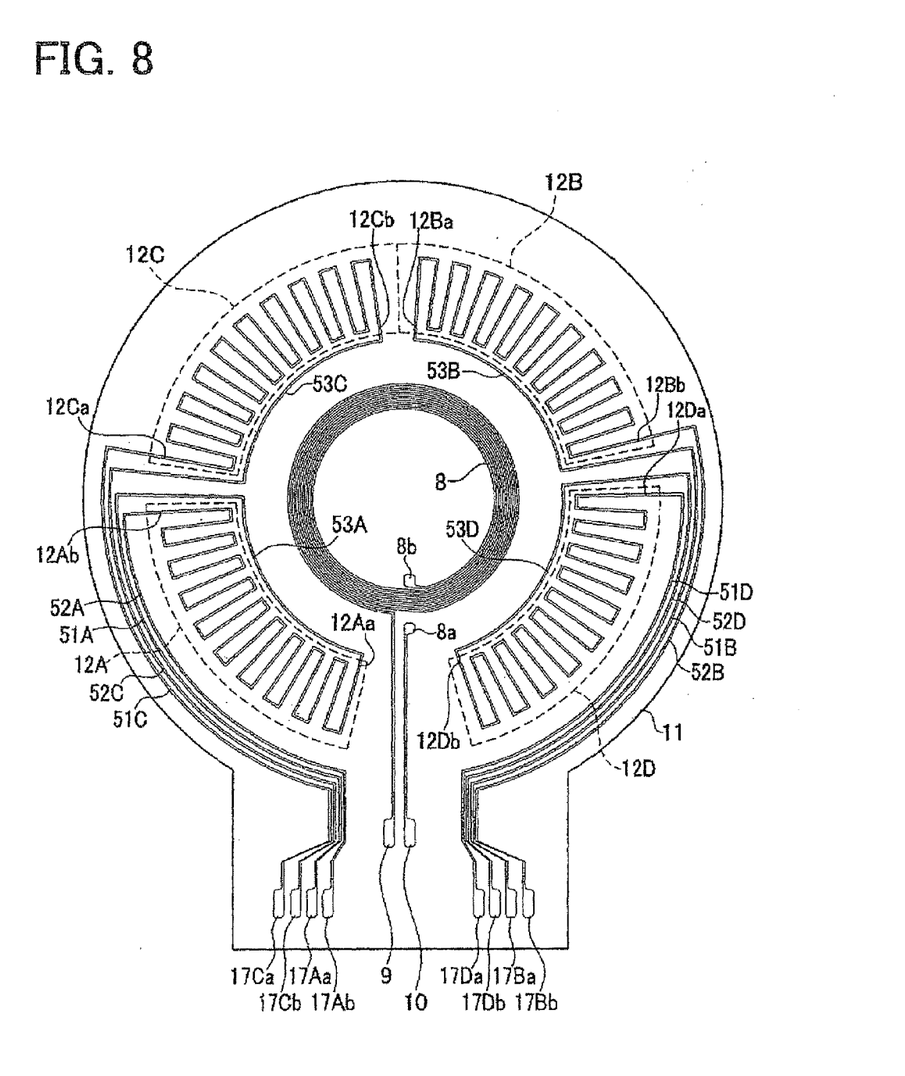
FIG. 8 is a view showing the shape and the placement of a detection coil of a rotary encoder of a fourth embodiment.

One end 12Aa of the detection coil 12A is connected to an external terminal 17Aa through a connecting portion 53A and a connecting portion 51A. The other end 12Ab of the detection coil 12A is connected to an external terminal 17Ab through a connecting portion 52A.

One end 12Ca of the detection coil 12C is connected to an external terminal 17Ca through a connecting portion 51C. The other end 12Cb of the detection coil 12C is connected to an external terminal 170 through a connecting portion 53C and a connecting portion 52C.

One end 12Ba of the detection coil 12B is connected to an external terminal 17Ba through a connecting portion 53B and a connecting portion 51B. The other end 12Bb of the detection coil 12B is connected to an external terminal 17Bb through a connecting portion 52B.

One end 12Da of the detection coil 12D is connected to an external terminal 17Da through a connecting portion 51D. The other end 12Db of the detection coil 12D is connected to an external terminal 17Db through a connecting portion 53D and a connecting portion 52D.

In the rotary encoder 50, the connecting portions 51A, 52A, 53A that join the detection coil 12A with the external terminals 17Aa and 17Ab, the connecting portions 51B, 52B, 53B that join the detection coil 12B with the external terminals 17Ba and 17Bb, the connecting portions 51C, 52C, 53C that join the detection coil 12C with the external terminals 17Ca and 17Cb, and the connecting portions 51D, 52D, 53D that join the detection coil 12D with the external terminals 17Da and 17Db are of almost equal length. Accordingly, four detection coils 12A to 12D are of equal impedance, so that the connecting portions provide the same influence to the induced current generated by magnetic force. This can reduce the occurrence of errors in the connecting portions and improve the detection accuracy.

According to the rotary encoder 50 of the fourth embodiment, two or more detection coils are wired so that respective impedances are equal. Thus, when a uniform magnetic flux is supplied to the stator substrate, the induced voltage is generated in each detection coil without errors and the detection accuracy can be enhanced.

Specifically, since the connecting portions 51 (51A-51D), 52 (52A-52D), and 53 (53A-53D) of each of the detection coils 12A, 12B, and 12C are equal in length and position, equal induced currents are generated with respect to a uniform magnetic flux. No errors are caused in the connecting portions.

In particular, the connecting portions 51 (51A-51D) and 52 (52A-52D) are placed on the outer circumferential side apart from the stator-side rotary transformer 8 located on the inner circumferential side. This makes it possible to reduce induced voltage (noise) generated in the magnetic flux in the connecting portions 51 and 52.

The present invention is not limited to the above embodiments and may be embodied in other specific forms without departing from the essential characteristics thereof.

The above embodiments show examples of arranging two detection coils, four detection coils, or eight detection coils. The number of detection coils may be an odd number or a larger number.

The above embodiments exemplify a high frequency of 2 MHz as the high frequency signal but may adopt any high frequency as long as it is 500 kHz or more.

The above embodiments exemplify the rotary encoder for measuring the rotation angle of a crank shaft of an engine. The invention may be applied to any measurement objects as well as the crank shaft.

The above embodiments explain the configurations that the detection coils are sequentially displaced from each other. The order of placement of the detection coils is not limited to the above mentioned. For instance, in the case of four detection coils, the second and subsequent detection coils may be sequentially displaced from the first detection coil by 135°, 90°, and 45° in electrical angle respectively. Other orders may also be adopted.

In the above embodiments, the detection coils may be formed with a displacement of 225° (45°+180°) instead of a displacement of 45°. By a displacement of 180°, an induced voltage of a reversed phase is detected. However, the same signal processing as in the above embodiments can be executed. From a technical viewpoint, such a case should be considered to be included in the configuration that the detection coils are displaced from each other by 360°/(2n) in electrical angle.

Reference Signs List

7 Rotor-side rotary transformer
8 Stator-side rotary transformer
11 Stator substrate
12A, 12B, 12C, 12D Detection coil
13 Rotor substrate
14 Excitation coil
21 Excitation circuit
22 High-frequency generating circuit
23 Wave shaping circuit
24 Exclusive logical sum (XOR) circuit
25 Demodulation circuit

The invention claimed is:

1. An electromagnetic induction type rotational position sensor comprising:
a rotor substrate and a stator substrate placed to face each other,
wherein the rotational position sensor is configured to detect rotational displacement of the rotor substrate,
wherein the rotor substrate comprises an excitation coil of a meandering pattern on an outer circumferential side of the rotor substrate and a rotor-side rotary transformer on an inner circumferential side of the rotor substrate,
wherein the stator substrate comprises n-pieces of detection coils of a meandering pattern on an outer circumferential side of the stator substrate and a stator-side rotary transformer on an inner circumferential side of the stator substrate, wherein n is an integer number of 3 or more,
wherein the n-pieces of detection coils are arranged in a circumferential direction without overlapping each other,
wherein the n-pieces of detection coils are displaced from each other by 360°/(2n) in electrical angle, and
wherein the rotational position sensor includes a high frequency excitation circuit for applying a high frequency signal to the excitation coil through the stator-side rotary transformer and the rotor-side rotary transformer.

2. The rotational position sensor according to claim 1, wherein the n-pieces of detection coils are formed on the same layer.

3. The rotational position sensor according to claim 1, wherein the high frequency signal is 500 kHz or higher.

4. The rotational position sensor according to claim 1, further comprising an exclusive logical sum circuit for outputting an exclusive logical sum of output signals of two or more of the detection coils.

5. The rotational position sensor according to claim 1, wherein the two or more detection coils are wired so that respective impedances are equal.

6. The rotational position sensor according to claim 1, wherein
the n-pieces of detection coils are four detection coils including first to fourth detection coils formed so that the second detection coil is displaced from the first detection coil by an electrical angle of 45°, the third detection coil is displaced from the second detection coil by an electrical angle of 45°, and the fourth detection coil is displaced from the third detection coil by an electrical angle of 45°.

7. The rotational position sensor according to claim 6, wherein
each of the detection coils has a cycle of 8° in mechanical angle, and
the detection coils are formed so that the second detection coil is displaced from the first detection coil by a mechanical angle of 1°, the third detection coil is displaced from the second detection coil by a mechanical angle of 1°, and the fourth detection coil is displaced from the third detection coil by a mechanical angle of 1°.

* * * * *